United States Patent
Harada (10) Patent No.: US 11,598,340 B2
(45) Date of Patent: Mar. 7, 2023

(54) ELECTRIC OIL PUMP HAVING TEMPERATURE SENSORS ON CIRCUIT BOARD AND TRANSMISSION TO EXECUTE ENERGIZATION PROHIBITION CONTROL OF PUMP

(71) Applicant: Honda Motor Co., Ltd., Tokyo (JP)

(72) Inventor: Masamichi Harada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 237 days.

(21) Appl. No.: 17/037,694

(22) Filed: Sep. 30, 2020

(65) Prior Publication Data
US 2021/0108644 A1 Apr. 15, 2021

(30) Foreign Application Priority Data
Oct. 10, 2019 (JP) .............................. JP2019-186761

(51) Int. Cl.
*F04D 15/00* (2006.01)
*F04D 13/06* (2006.01)
(Continued)

(52) U.S. Cl.
CPC ......... *F04D 15/0077* (2013.01); *F04D 13/06* (2013.01); *F04D 13/12* (2013.01);
(Continued)

(58) Field of Classification Search
CPC ....... F04D 15/0263; F02P 29/62; F02P 29/66; H02P 29/62; H02P 29/66
See application file for complete search history.

(56) References Cited

U.S. PATENT DOCUMENTS

| 8,801,391 B2 * | 8/2014 | Kigure | F04B 49/06 |
| | | | 417/44.11 |
| 9,039,383 B2 * | 5/2015 | Okamoto | F16H 61/0031 |
| | | | 417/32 |

(Continued)

FOREIGN PATENT DOCUMENTS

| JP | 2012057688 | * | 3/2012 | ............. F16H 61/00 |
| JP | 2014234854 | | 12/2014 | |

OTHER PUBLICATIONS

"Office Action of Japan Counterpart Application" with English translation thereof, dated Aug. 31, 2021, p. 1-p. 4.
(Continued)

*Primary Examiner* — Nathan C Zollinger
*Assistant Examiner* — Timothy P Solak
(74) *Attorney, Agent, or Firm* — JCIPRNET (57) ABSTRACT

A power supply controller includes a driver having a circuit board and controlling an operation of an electric oil pump, a control unit controlling power supply to the driver, a board temperature sensor detecting a temperature of the circuit board; and an oil temperature sensor detecting a temperature of a working oil of a transmission as an oil temperature. The control unit executes energization prohibition control for prohibiting power supply to the driver when the temperature of the circuit board detected by the board temperature sensor exceeds a predetermined first threshold temperature, and executes cancellation determination for determining whether to cancel the energization prohibition control based on the oil temperature detected by the oil temperature sensor during execution of the energization prohibition control.

6 Claims, 4 Drawing Sheets

(51) Int. Cl.
    *F04D 13/12*     (2006.01)
    *H02P 29/68*     (2016.01)
    *F04D 15/02*     (2006.01)
    *F04D 13/02*     (2006.01)
    *F04D 29/58*     (2006.01)
    *F04B 23/04*     (2006.01)
    *F04C 14/28*     (2006.01)
    *F04B 49/02*     (2006.01)
    *F04B 17/03*     (2006.01)
    *F04B 49/10*     (2006.01)
    *F04B 49/06*     (2006.01)

(52) U.S. Cl.
    CPC ............... *F04B 17/03* (2013.01); *F04B 23/04* (2013.01); *F04B 49/02* (2013.01); *F04B 49/065* (2013.01); *F04B 49/10* (2013.01); *F04C 14/28* (2013.01); *F04D 13/02* (2013.01); *F04D 15/0263* (2013.01); *F04D 29/5806* (2013.01); *H02P 29/68* (2016.02)

(56)                       References Cited

U.S. PATENT DOCUMENTS

| | | | | |
|---|---|---|---|---|
| 9,701,204 | B2* | 7/2017 | Suzuki | B60L 15/00 |
| 9,777,828 | B2* | 10/2017 | Yoshitani | F16H 57/0441 |
| 2017/0082104 | A1* | 3/2017 | Yamamoto | F04C 15/0096 |

OTHER PUBLICATIONS Office Action of Japan Counterpart Application, with English translation thereof, dated Jun. 8, 2021, pp. 1-8.

* cited by examiner

ELECTRIC OIL PUMP HAVING TEMPERATURE SENSORS ON CIRCUIT BOARD AND TRANSMISSION TO EXECUTE ENERGIZATION PROHIBITION CONTROL OF PUMP

CROSS-REFERENCE TO RELATED APPLICATION

This application claims the priority benefits of Japanese application no. 2019-186761, filed on Oct. 10, 2019. The entirety of the above-mentioned patent application is hereby incorporated by reference herein and made a part of this specification.

BACKGROUND

Technical Field

The disclosure relates to a power supply controller that controls supply of electric power to an electric oil pump which supplies oil pressure to a driving force transmission mechanism.

Description of Related Art

In recent years, the so-called mechanically and electrically integrated electric oil pump has been adopted, which integrally incorporates an electronic control part composed of a semiconductor element, etc. for controlling the operating state of the electric oil pump into the electric oil pump that supplies oil pressure to a hydraulic driving force transmission mechanism such as a vehicle transmission, to carry out operation optimization and abnormality detection by an in-vehicle LAN (Local Area Network) that uses a communication protocol such as CAN (Controller Area Network).

For example, Patent Document 1 discloses technology that an electric oil pump provided with a circuit board having a CPU includes a comparison part for comparing board temperature information about the temperature of the circuit board obtained from a board temperature sensor with comparison temperature information correlating to the temperature change of the circuit board obtained from another sensor, and monitors whether the board temperature information obtained from the board temperature sensor is changing normally to detect an abnormality of the board temperature sensor.

RELATED ART

Patent Document

[Patent Document 1] Japanese Laid-Open No. 2011-234854

Problems to be Solved

Such a mechanically and electrically integrated electric oil pump has a problem that the board temperature is likely to reach a high temperature that exceeds the heat resistance limit of the CPU due to the fact that the circuit board is continuously exposed to the high temperature working oil. Regarding this problem, although there is an option to use a CPU that has high heat resistance, using a CPU with a special specification causes another problem, that is, an increase in cost. To cope with such a problem, the conventional measures are, for example, to incorporate self-protection control that automatically shuts down the CPU when the board temperature exceeds a predetermined temperature, so as to prevent the CPU from operating in a high temperature environment higher than the heat resistant temperature and prevent failure or damage.

Here, it is known that a general CPU has a higher heat resistant temperature in the non-energized state when compared with the energized state. If the self-protection control as described above is used, the operation of the CPU is stopped when the temperature exceeds the predetermined temperature, but the power supply to the CPU itself is maintained, so if the temperature rises further from that point and approaches the heat resistance limit temperature of the energized state or exceeds the heat resistance limit temperature, the CPU may fail or be damaged. Since CPU failure or damage may make it impossible to perform self-detection or detection through a host controller, normally, the predetermined temperature at which the operation of the CPU is stopped is set sufficiently lower than the heat resistance limit temperature of the energized state, so as to stop the CPU having a rising temperature at an early stage. As a result, it is possible to prevent the temperature of the CPU from reaching the heat resistance limit temperature of the energized state. However, as an adverse effect, the time during which the electric oil pump cannot be controlled increases, which results in the problem that fuel consumption deteriorates when the electric oil pump is used for idle stop.

In addition, in the case of a system that automatically shuts down the CPU at a high temperature by using the board temperature information obtained from the board temperature sensor provided in the circuit board of the electric oil pump as described in Patent Document 1, since the board temperature information cannot be obtained when the CPU is shut down, it is not possible to accurately detect or infer the subsequent change of the board temperature and to confirm that the temperature of the CPU has dropped sufficiently. Therefore, it is necessary to set a long waiting time before the CPU is operated again.

Furthermore, if the CPU is automatically shut down by self-protection control, consequently the oil pressure supplied from the electric oil pump suddenly decreases, which may cause damage to the driving force transmission mechanism.

SUMMARY

According to an embodiment of the disclosure, a power supply controller is provided for controlling supply of electric power to an electric oil pump 3 in a vehicle, which includes a hydraulic driving force transmission mechanism (transmission 6 in the embodiment (the same hereinafter)) transmitting a driving force to a drive wheel, and the electric oil pump 3 supplying an oil pressure to the driving force transmission mechanism. The power supply controller includes: an electric oil pump control part (driver 4) including a circuit board and controlling an operation of the electric oil pump; a power supply control part (control unit 2) controlling power supply to the electric oil pump control part; a first temperature detection device (board temperature sensor 5) detecting a temperature TCPU of the circuit board; and a second temperature detection device (oil temperature sensor 7) provided in the driving force transmission mechanism and detecting a temperature of a working oil in the driving force transmission mechanism as an oil temperature TOIL. The power supply control part executes energization prohibition control (FIG. 2) for prohibiting power supply to the electric oil pump control part when the temperature TCPU of the circuit board detected by the first temperature detection device exceeds a predetermined first threshold temperature TTHR1, and executes cancellation determination (FIG. 3) for determining whether to cancel the energization prohibition control based on the oil temperature TOIL detected by the second temperature detection device during execution of the energization prohibition control.

DESCRIPTION OF THE EMBODIMENTS

In view of the above, the disclosure provides a power supply controller that, when the electric oil pump is at a high temperature, can appropriately protect the circuit board of the driver which controls the operation of the electric oil pump without incurring the cost for improving the heat resistance performance, and can shorten the time required for returning the circuit board from the protection state to the normal operation state.

Means for Solving the Problems

According to an embodiment of the disclosure, a power supply controller is provided for controlling supply of electric power to an electric oil pump 3 in a vehicle, which includes a hydraulic driving force transmission mechanism (transmission 6 in the embodiment (the same hereinafter)) transmitting a driving force to a drive wheel, and the electric oil pump 3 supplying an oil pressure to the driving force transmission mechanism. The power supply controller includes: an electric oil pump control part (driver 4) including a circuit board and controlling an operation of the electric oil pump; a power supply control part (control unit 2) controlling power supply to the electric oil pump control part; a first temperature detection device (board temperature sensor 5) detecting a temperature TCPU of the circuit board; and a second temperature detection device (oil temperature sensor 7) provided in the driving force transmission mechanism and detecting a temperature of a working oil in the driving force transmission mechanism as an oil temperature TOIL. The power supply control part executes energization prohibition control (FIG. 2) for prohibiting power supply to the electric oil pump control part when the temperature TCPU of the circuit board detected by the first temperature detection device exceeds a predetermined first threshold temperature TTHR1, and executes cancellation determination (FIG. 3) for determining whether to cancel the energization prohibition control based on the oil temperature TOIL detected by the second temperature detection device during execution of the energization prohibition control.

According to the power supply controller, the power supply control part executes the energization prohibition control for prohibiting power supply to the electric oil pump control part when the temperature of the circuit board detected by the first temperature detection device exceeds the predetermined first threshold temperature. As a result, by stopping the operation of the electric oil pump control part in the non-energized state where the heat resistance performance is higher than that in the energized state, failure or damage of the electric oil pump control part due to high temperature can be effectively prevented without incurring the cost for improving the heat resistance performance.

In addition, since the energization prohibition control is executed by the power supply control part, unlike the conventional CPU automatic shutdown performed by self-protection control, it is possible to prevent the oil pressure from suddenly dropping, so it is also possible to prevent the driving force transmission mechanism from being damaged by a sudden change of load.

Further, during execution of the energization prohibition control, the power supply control part executes the cancellation determination for determining whether to cancel the energization prohibition control based on the oil temperature in the driving force transmission mechanism that has a high correlation with the board temperature. Therefore, it is possible to shorten the time to cancellation of the energization prohibition control.

Figure 6:
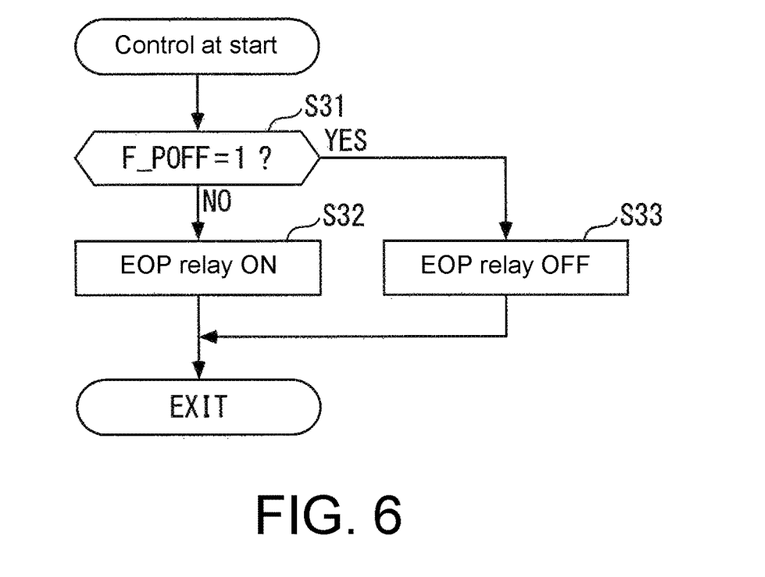
FIG. 6 is a flowchart showing a control process when the control unit is started.

According to an embodiment of the disclosure, the power supply controller further includes a storage part 8 storing whether the energization prohibition control has been executed in a state where power supply to the electric oil pump control part is stopped as energization prohibition control information (energization prohibition flag F_POFF). The power supply control part determines whether to execute the energization prohibition control based on the energization prohibition control information when power supply is restarted after power supply to the electric oil pump control part is stopped (FIG. 6).

According to this configuration, whether the energization prohibition control has been executed is stored as the energization prohibition control information even when power supply to the power supply control part is stopped. As a result, for example, even if temporary power failure occurs to the power supply control part due to instantaneous power or the like during execution of the energization prohibition control, by referring to the energization prohibition control information after restoring from the power failure, the energization prohibition control can be executed again, and the electric oil pump control part in a high temperature state can be appropriately protected.

According to an embodiment of the disclosure, in the power supply controller, the power supply control part cancels the energization prohibition control when the oil temperature TOIL drops below a predetermined second threshold temperature TTHR2 lower than the first threshold temperature TTHR1 and an integrated value $\Sigma\Delta T$ of a difference $\Delta T$ obtained by subtracting the oil temperature TOIL, from the second threshold temperature TTHR2 exceeds a predetermined value TREF in the cancellation determination (Steps 11, 15, 16, and 13 of FIG. 3 and FIG. 4).

As described above, in the cancellation determination of the energization prohibition control, whether the energization prohibition control can be cancelled, that is, whether the temperature of the circuit board of the electric oil pump control part has sufficiently dropped is determined based on the oil temperature in the driving force transmission mechanism that has a high correlation with the board temperature. Here, since there is a certain degree of divergence between the actual board temperature and the oil temperature, if the cancellation determination of the energization prohibition control is performed simply depending on whether the oil temperature has dropped below a predetermined temperature, it is necessary to set the predetermined temperature used for the determination to a lower temperature in order to secure a temperature difference that may occur between the board temperature and the oil temperature as a safety margin. Therefore, the time required for cancelling the energization prohibition control also becomes longer.

In order to solve such a problem, in this configuration, in the cancellation determination of the energization prohibition control, the condition that the oil temperature drops below the predetermined second threshold temperature lower than the first threshold temperature, and the integrated value of the difference obtained by subtracting the oil temperature from the second threshold temperature exceeds the predetermined value is set as a condition for cancelling the energization prohibition control. That is, not only the condition that the oil temperature drops below the second threshold temperature is set as a condition for cancellation, the value of the oil temperature and the elapsed time are also taken into the cancellation determination. With this configuration, the second threshold temperature can be set without incorporating a temperature difference that may occur between the board temperature and the oil temperature as a margin, and the time required for cancelling the energization prohibition control can be shortened.

According to an embodiment of the disclosure, in the power supply controller, the power supply control part cancels the energization prohibition control regardless of the integrated value when the oil temperature TOIL drops below a predetermined third threshold temperature TTHR3 lower than the second threshold temperature TTHR2 in the cancellation determination (Steps 12 and 13 of FIG. 3).

According to this configuration, when the detected oil temperature drops below the third threshold temperature set lower than the second threshold temperature, under the assumption that the board temperature, which has a high correlation with the oil temperature, is already sufficiently low, the energization prohibition control is immediately cancelled without using the integrated value described above. As a result, the time required for cancelling the energization prohibition control can be further shortened.

According to an embodiment of the disclosure, in the power supply controller, an oil pressure supply device 21 supplying an oil pressure to the driving force transmission mechanism is provided. The oil pressure supply device 21 includes the electric oil pump 3 and another oil pump Pb provided on an upstream side of the electric oil pump 3, and the electric oil pump 3 further pressurizes an oil pressure supplied from the another oil pump and supplies the oil pressure to the driving force transmission mechanism.

According to this configuration, the electric oil pump and the another oil pump are connected in series, and the electric oil pump further pressurizes the oil pressure supplied from the another oil pump and supplies the oil pressure to the driving force transmission mechanism. Compared with connecting the electric oil pump and the another oil pump in parallel and using them for different purposes, in the configuration of the disclosure, the frequency of use of the motor that drives the electric oil pump is increased, and the frequency of high temperature working oil passing through the electric oil pump is increased as well. Therefore, although the temperature inside the electric oil pump is likely to increase and consequently the temperature of the circuit board provided in the electric oil pump is likely to increase as well, in such a case, the energization prohibition control for the electric oil pump control part is executed by the power supply control part, so damage or failure of the electric oil pump control part can be effectively prevented.

Figure 1:
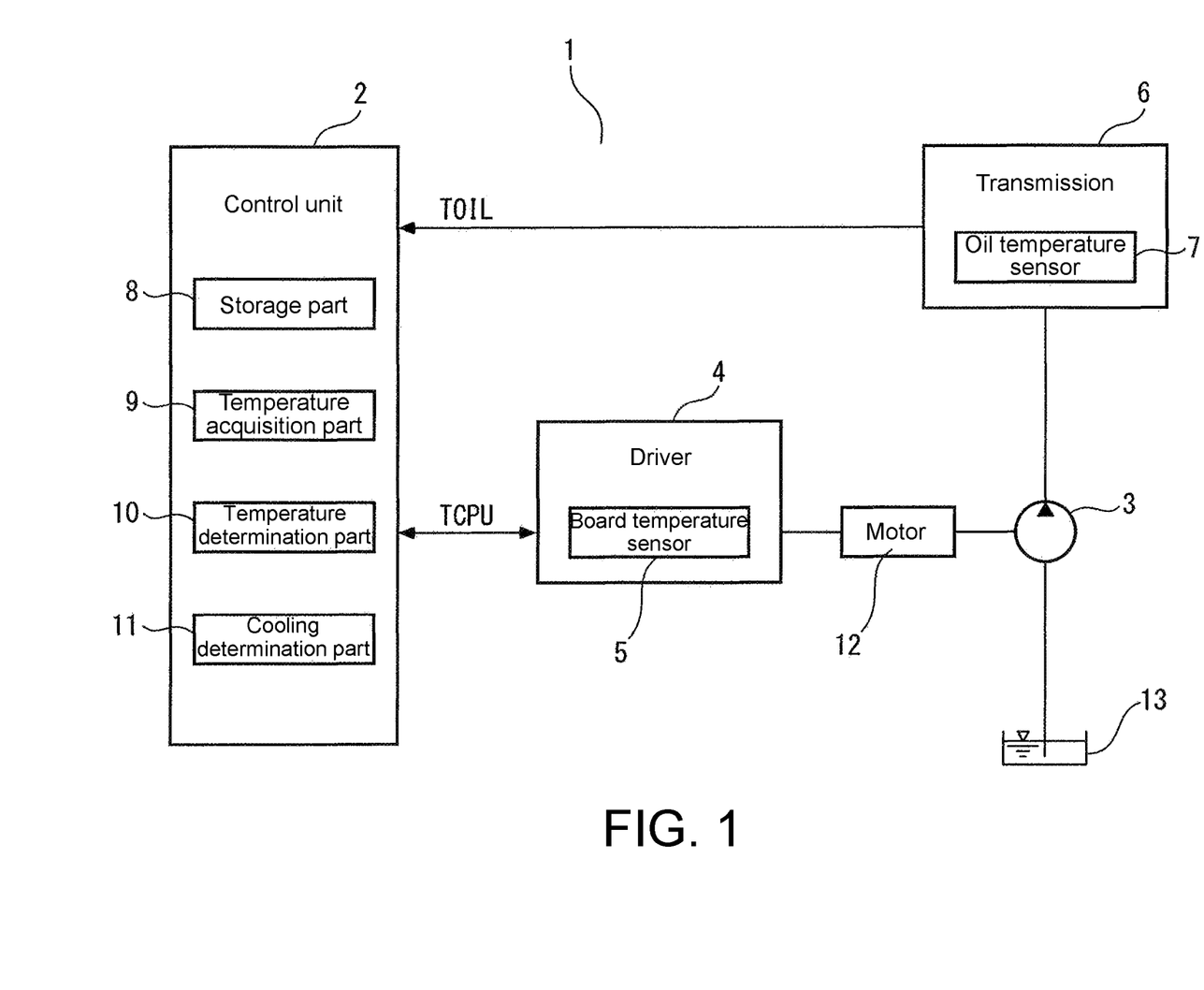
FIG. 1 is a configuration diagram of the power supply controller according to an embodiment of the disclosure.

Hereinafter, exemplary embodiments of the disclosure will be described in detail with reference to the drawings. FIG. 1 is a configuration diagram of a power supply controller according to an embodiment of the disclosure. The power supply controller 1 is applied to a vehicle (not shown) equipped with a transmission 6 and an electric oil pump 3 that supplies oil pressure to the transmission 6, and controls supply of electric power for driving the electric oil pump 3.

The electric oil pump 3 is driven by a motor 12 supplied with electric power from a battery (not shown) or the like, and pressurizes oil (working oil) drawn from an oil tank 13 and supplies the oil to the transmission 6. The motor 12 is driven by control of a driver 4. The driver 4 includes a circuit board (not shown) having a CPU, and controls the driving of the motor 12 based on a control signal supplied from a control unit 2. That is, the driver 4 controls the driving of the motor 12 to control the operation of the electric oil pump 3. The driver 4 is provided with a board temperature sensor 5 that detects the temperature of the circuit board which constitutes the driver 4, and the driver 4 sequentially transmits the temperature TCPU of the circuit board of the driver 4 detected by the board temperature sensor 5 to the control unit 2. The board temperature sensor 5 may be built in the driver 4 or may be provided externally as long as the board temperature sensor 5 can detect the temperature TCPU of the circuit board of the driver 4.

The transmission 6 includes, for example, a belt-type hydraulic continuously variable transmission mechanism having a driven pulley and a drive pulley (not shown). The transmission 6 is provided with an oil temperature sensor 7 that detects the temperature of the oil supplied from the electric oil pump 3 as the oil temperature TOIL. The oil temperature sensor 7 sequentially transmits the detected oil temperature TOIL to the control unit 2.

The control unit 2 includes a microcomputer composed of a CPU, a RAM, a ROM, an I/O interface (none is shown), etc. The control unit 2 realizes the functions of a temperature acquisition part 9, a temperature determination part 10, and a cooling determination part 11 by reading and executing the programs stored in a storage part 8. The control unit 2 acquires the board temperature TCPU detected by the board temperature sensor 5 and the oil temperature TCPU detected by the oil temperature sensor 7 and executes the energization prohibition control process described later, and according to the result, switches on/off a relay (not shown) provided in the wiring that supplies electric power to the driver 4, so as to switch between energization and non-energization for the driver 4.

Further, in the present embodiment, the storage part 8 of the control unit 2 includes a non-volatile memory. The storage part 8 stores whether the above-described energization prohibition control is being executed immediately before the control unit 2 is stopped (end of energization). As will be described later, the control unit 2 refers to the storage part 8 at the time when it is started (at the time of start of energization) and determines whether to execute the energization prohibition control. In the present embodiment, the storage part 8 is provided in the control unit 2. However, the storage part 8 may be configured as a part of a higher-level control unit or may be configured as an independent component as long as the control unit 2 can refer to the storage part 8 when started.

The operation of the power supply controller 1 according to the present embodiment configured as described above will be described with reference to FIG. 2 to FIG. 6. The power supply controller 1 according to the present embodiment executes the energization prohibition control for prohibiting energization to the driver 4 when the circuit board of the driver 4 is in a high temperature state exceeding a predetermined temperature, and determines whether to cancel the energization prohibition control based on the oil temperature TOIL, which is the temperature of the working oil in the electric oil pump 3 having a high correlation with the board temperature TCPU, during execution of the energization prohibition control.

Figure 2:
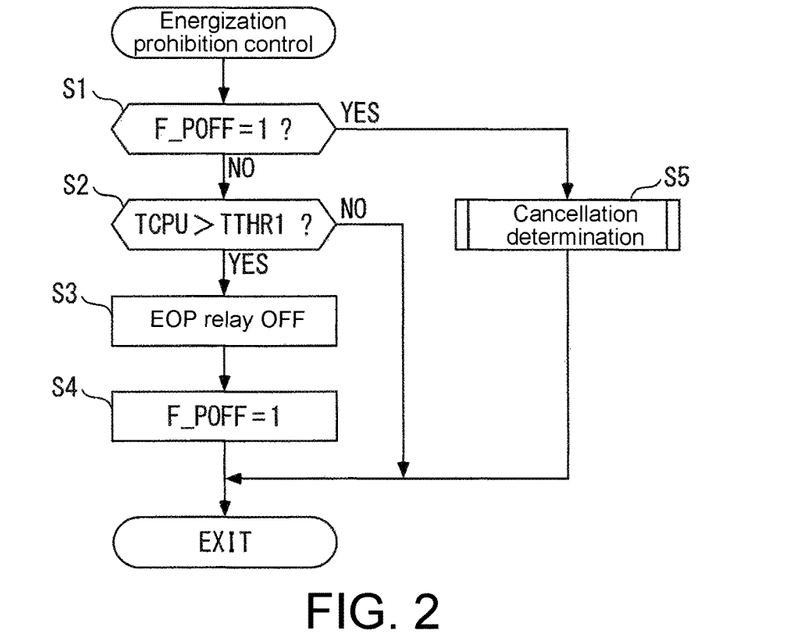
FIG. 2 is a flowchart showing a control process of energization prohibition for the circuit board of the driver of the electric oil pump.

FIG. 2 is a flowchart showing a control process of energization prohibition for the driver 4, This process is repeatedly executed, for example, in a predetermined cycle until the energization to the control unit 2 is turned off after the control at the time of start of the control unit 2 described later is executed. First, in Step 1 (illustrated as "S1", the same applies hereinafter), whether the energization prohibition flag F_POFF is "1" is determined. The energization prohibition flag F_POFF is set to "1" when the energization prohibition control for prohibiting energization for the driver 4 is being executed, and is set to "0" when the energization prohibition control is not executed. The value of the energization prohibition flag F_POFF is stored in the storage part 8 of the control unit 2 and is not lost even when energization to the control unit 2 is turned off. If the result of determination in Step 1 is NO, and the energization prohibition control is not executed, the process proceeds to the next Step 2.

In Step 2, whether the current board temperature TCPU that the temperature acquisition part 9 acquires from the driver 4 is higher than a predetermined first threshold temperature TTHR1 is determined by the temperature determination part 10 of the control unit 2. The first threshold temperature TTHR1 is set to a temperature lower than the heat resistance limit temperature in the energized state of the CPU included in the circuit board of the driver 4. In addition, if self-protection control for automatically shutting down the CPU when the CPU reaches a predetermined temperature is incorporated into the driver 4, the first threshold temperature TTHR1 is set to a temperature lower than the predetermined temperature at which the CPU automatically shuts down. If the result of determination in Step 2 is NO, that is, if the board temperature TCPU is equal to or lower than the first threshold temperature TTHR1, this process ends. If the result of determination in Step 2 is YES, that is, if the board temperature TCPU is higher than the first threshold temperature TTHR1, the process proceeds to the next Step 3.

In Step 3, energization to the driver 4 is prohibited, and the operation of the electric oil pump 3 is stopped by turning off a relay (EOP relay) provided in the wiring that supplies electric power to the driver 4 according to a command of the control unit 2. As a result, the driver 4 enters the non-energized state, and the heat resistant temperature of the CPU is higher than that in the energized state, by which it is possible to effectively prevent failure or damage of the CPU exposed to a high temperature. Unlike the conventional automatic shutdown performed by the self-protection control of the CPU, the energization prohibition control is performed under the control of the control unit 2, which is a higher-level control part, so it is possible to prevent the oil pressure from suddenly dropping due to the sudden stop of the operation of the CPU, and to prevent the transmission 6 from being damaged.

Finally, in Step 4, the value of the energization prohibition flag F_POFF is set to "1", and this process ends.

On the other hand, if the result of determination in Step 1 is YES, that is, if the energization prohibition control is being executed, whether to cancel the energization prohibition control described later is determined (cancellation determination) (Step 5), and then this process ends.

Figure 3:
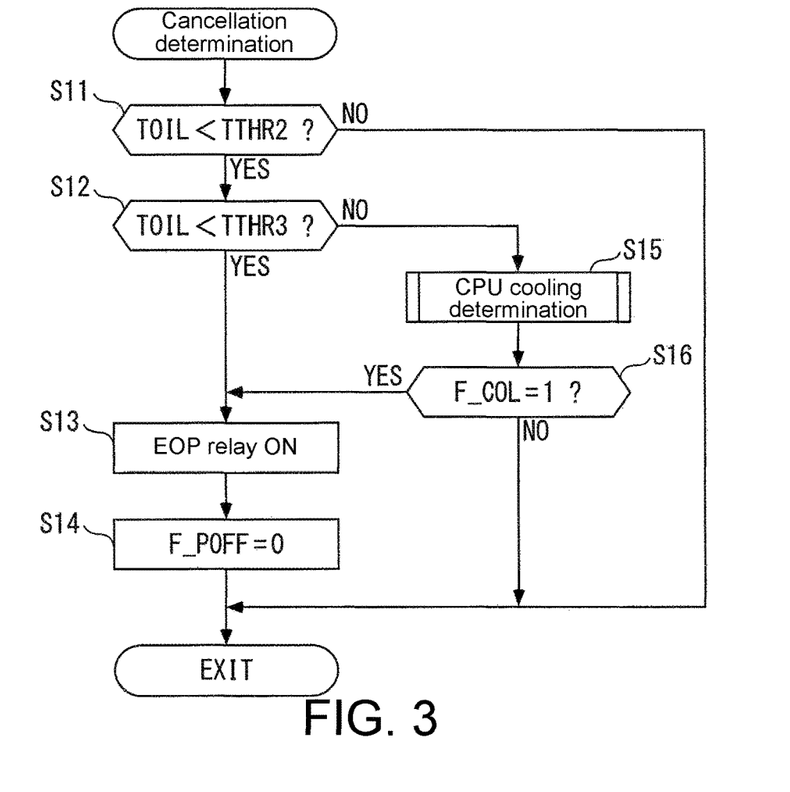
FIG. 3 is a flowchart showing a process of cancellation determination of the energization prohibition control.

FIG. 3 shows a subroutine of the cancellation determination process of the energization prohibition control. In this process, first, in Step 11, whether the current oil temperature TOIL that the temperature acquisition part 9 acquires from the oil temperature sensor 7 is lower than a second threshold temperature TTHR2 is determined by the temperature determination part 10 of the control unit 2. The second threshold temperature TTHR2 is set to a temperature lower than the first threshold temperature TTHR1. If the result of determination in Step 11 is NO, that is, if the oil temperature TOIL is equal to or higher than the second threshold temperature TTHR2, this process ends directly (that is, the energization prohibition control is not cancelled). On the other hand, if the result of determination in Step 11 is YES, that is, if the oil temperature TOIL is lower than the second threshold temperature TTHR2, the process proceeds to the next Step 12.

In Step 12, whether the current oil temperature TOIL that the temperature acquisition part 9 acquires from the oil temperature sensor 7 is lower than a third threshold temperature TTHR3 is determined by the temperature determination part 10 of the control unit 2. The third threshold temperature TTHR3 is set to a temperature lower than the second threshold temperature TTHR2, and is preferably set to a temperature that, if the oil temperature TOIL, is equal to or lower than that temperature, the board temperature TCPU, which correlates to the oil temperature TOIL, is also always sufficiently lower than the heat resistance limit temperature during energization. If the result of determination in Step 12 is YES, that is, if the oil temperature TOIL is lower than the third threshold temperature TTHR3, the process proceeds to the next Step 13.

In Step 13, the relay provided in the wiring that supplies electric power to the driver 4 is switched from off to on according to the command of the control unit 2. As a result, the energization prohibition control for the driver 4 is cancelled, the energization to the driver 4 is restarted, and the operation of the electric oil pump 3 is restarted. Then, in Step 14, the value of the energization prohibition flag F_POFF is set to "0", and this process ends.

On the other hand, if the result of determination in Step 12 is NO; that is; if the oil temperature TOIL is equal to or higher than the third threshold temperature TTHR3, in Step 15, the CPU cooling determination described later is executed. Then, in the next Step 16, whether the value of a CPU cooling flag F_COL set by the CPU cooling determination is "1" is determined. If the result of determination is YES, the process proceeds to Step 13, and the energization prohibition control for the driver 4 is cancelled. On the other hand, if the result determination is NO, this process ends without cancelling the energization prohibition control.

Figure 4:
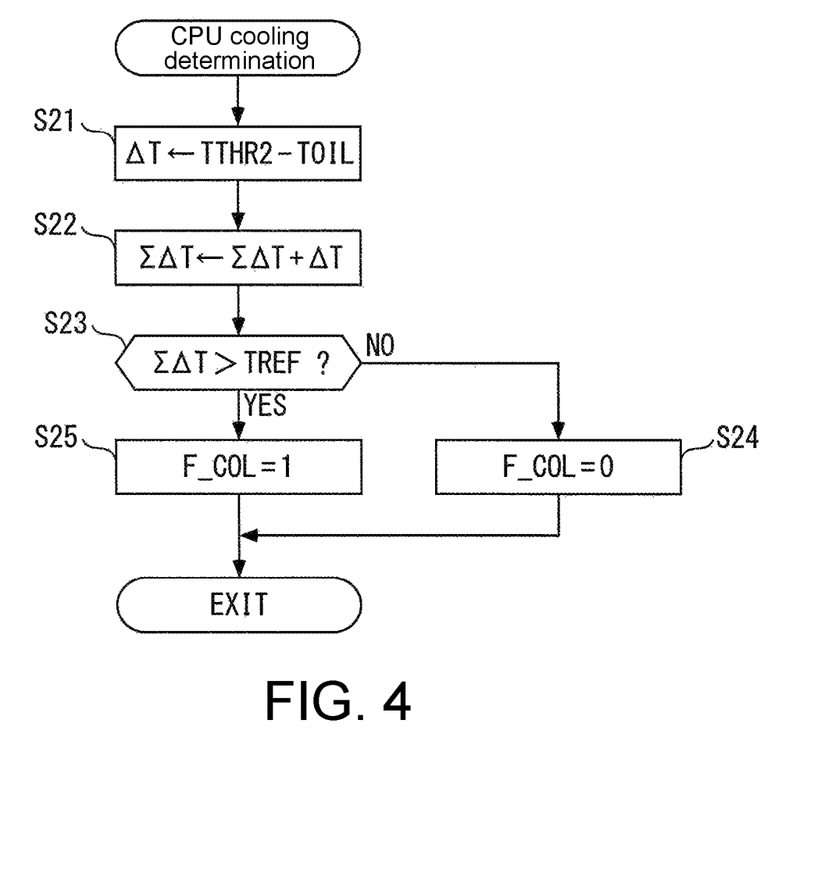
FIG. 4 is a flowchart showing process of CPU cooling determination.

FIG. 4 shows a subroutine of the CPU cooling determination process. In this process, first, in Step 21, a difference ΔT is calculated by subtracting the oil temperature TOIL from the second threshold temperature TTHR2. Next, in Step 22, the calculated difference ΔT is added to the current integrated value ΣΔT to obtain a new integrated value ΣΔT.

As described above, the integrated value ΣΔT is obtained by integrating the difference ΔT calculated for each execution cycle of the CPU cooling determination process. The integrated value ΣΔT is reset at the start of the first CPU cooling determination process after the energization prohibition control is executed. Next, in Step 23, whether the integrated value ΣΔT is larger than a predetermined value TREF is determined. If the result of determination is NO, the process proceeds to Step 24, the value of the CPU cooling flag F_COL is set to "0" and this process ends. On the other hand, if the result of determination is YES, it is determined that the CPU has been sufficiently cooled, the process proceeds to Step 25, the value of the CPU cooling flag F_COL is set to "1", and this process ends. Thereafter, as described above, in Step 16 of FIG. 3, the value of the CPU cooling flag F_COL is determined, and the energization prohibition control is continued if the value is "0", and the energization prohibition control is cancelled if the value is "1".

Figure 5:
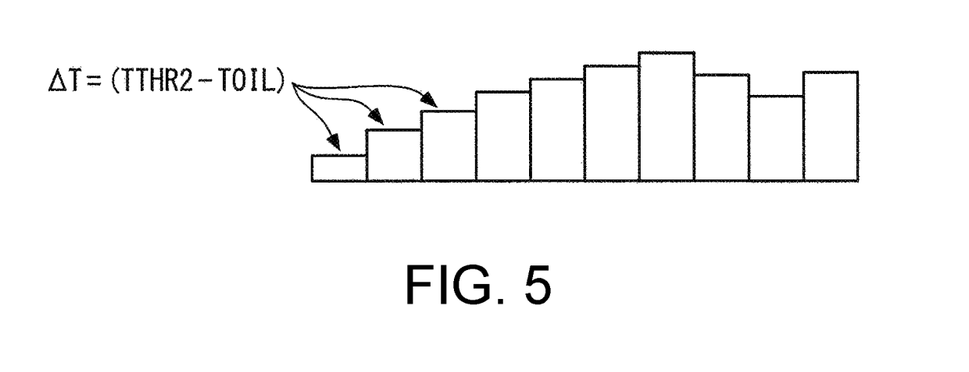
FIG. 5 is a diagram for explaining the relationship between oil temperature and elapsed time in CPU cooling determination.

As described above, in the CPU cooling determination, if the integrated value τΔT of the difference ΔT obtained by subtracting the value of the oil temperature TOIL from the second threshold temperature TTHR2 exceeds the predetermined value TREE it is determined that the CPU has been sufficiently cooled. That is, instead of simply performing the CPU cooling determination immediately depending on whether the value of the oil temperature TOIL drops below the second threshold temperature TTHR2, as shown in FIG. 5, how much the value of the oil temperature TOIL is below the second threshold temperature TTHR2 is calculated as the difference ΔT (=TTHR2−TOIL), and then in order to reflect the elapsed time in that state, it is determined that the CPU has been sufficiently cooled if the integrated value ΣΔT of the difference ΔT calculated for each execution cycle exceeds the predetermined value TREF.

By performing the above CPU cooling determination process, if the oil temperature TOIL, is high, a longer elapsed time is required before it is determined that the CPU has been sufficiently cooled, and if the oil temperature TOIL is low, it is estimated that the temperature of the CPU has already dropped sufficiently. Thus, it is possible to determine that the CPU has been sufficiently cooled in a shorter elapsed time. Therefore, the CPU cooling can be determined more accurately and in a shone e, compared with simply using whether the oil temperature TOIL is lower than the predetermined temperature as the condition for determination.

As described above, in the cancellation determination of the energization prohibition control, if the oil temperature TOIL is lower than the second threshold temperature TTHR2 and lower than the third threshold temperature TTHR3, the energization prohibition control for the driver 4 is immediately cancelled, and if the oil temperature TOIL is lower than the second threshold temperature TTHR2 but equal to or higher than the third threshold temperature TTHR3, whether the CPU has been cooled is determined using the integrated value ΣΔT of the difference ΔT obtained by subtracting the value of the oil temperature TOIL from the second threshold temperature TTHR2. As a result, the board temperature TCPU can be accurately estimated based on the oil temperature TOIL, and the energization prohibition control for the driver 4 can be cancelled appropriately in a short time.

Next, a control process executed when the control unit 2 is started will be described with reference to FIG. 6. In this process, when the energization to the control unit 2 is started and the control unit 2 is started, in Step 31, whether the value of the energization prohibition flag F_POFF is "1" is determined. If the result of determination is NO, in Step 32, the relay provided in the wiring that supplies electric power to the driver 4 is turned on according to the command of the control unit 2, and this process ends. On the other hand, if the result of determination is YES, in Step 33, the relay is turned off according to the command of the control unit 2, and this process ends.

For example, while the board temperature TCPU is rising and the energization prohibition control is being executed, after temporary power failure occurs to the control unit 2 due to instantaneous power or the like, the energization to the control unit 2 may be restored in a state where the board temperature TCPU is still high. In such a case, by executing the control process when the control unit 2 is started as described above, the control unit 2 still refers to the value of the energization prohibition flag F_POFF stored in the storage part 8 to prohibit the energization to the driver 4, Therefore, the CPU of the circuit board of the driver 4 can be reliably protected.

After this process ends, as described above, the energization prohibition control process and the cancellation determination process of the energization prohibition control for the driver 4 described with reference to FIG. 2 to FIG. 5 are repeatedly executed, for example, in a predetermined cycle.

Figure 7:
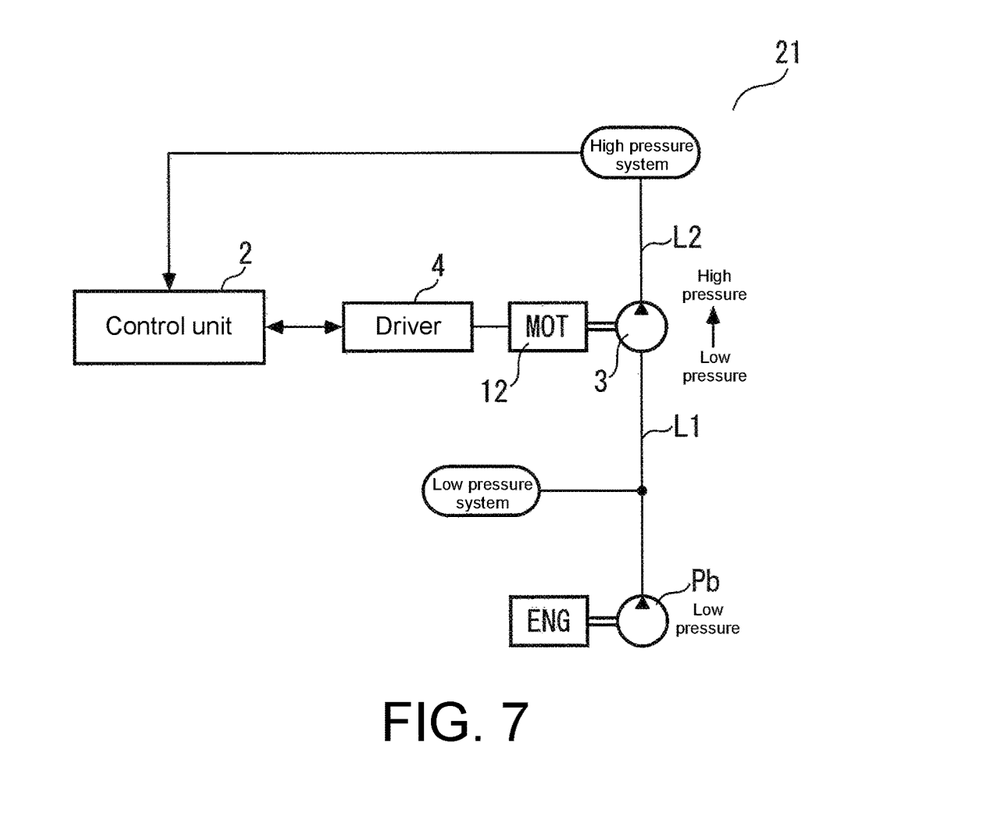
FIG. 7 is a diagram showing an outline of the oil pressure supply device according to an embodiment of the disclosure.

Next, an oil pressure supply device to which the power supply controller according to an embodiment of the disclosure described above can be applied will be described with reference to FIG. 7. The oil pressure supply device 21 includes an electric oil pump 3 and another oil pump Pb provided on the upstream side of the electric oil pump 3.

The another oil pump Pb is driven by an engine ENG, and draws oil (working oil) from an oil tank (not shown) and pumps the oil. An oil passage L1 is connected to the output side of the another oil pump Pb for the oil pumped from the another oil pump Pb to flow through. A low pressure system of the transmission is connected to the downstream side of the oil passage L1. The low pressure system is, for example, a low pressure hydraulic operating part such as a torque converter. In addition, the electric oil pump 3 is connected to the downstream side of the oil passage L1.

The electric oil pump 3 is driven by the rotation of the motor 12 and further pressurizes and pumps the oil supplied from the another oil pump Pb. An oil passage L2 is connected to the output side of the electric oil pump 3 for the oil pumped from the electric oil pump 3 to flow through. A high pressure system of the transmission is connected to the downstream side of the oil passage L2. The high pressure system is, for example, a high pressure hydraulic operating part such as a belt-type hydraulic continuously variable transmission mechanism having a driven pulley and a drive pulley (not shown). The high pressure system is provided with an oil temperature sensor (not shown) that detects the temperature of the oil supplied from the electric oil pump 3 as the oil temperature TOIL.

It is possible to apply the power supply controller according to an embodiment of the disclosure described above to the oil pressure supply device having the above configuration. According to this configuration, the electric oil pump 3 and the another oil pump Pb are connected in series, and the oil pressure supplied from the another oil pump Pb is further pressurized and supplied to the high pressure system. Therefore, compared with using two oil pumps in parallel for different purposes, for example, using the another oil pump Pb to supply oil pressure only to the low pressure system and using the electric oil pump 3 to separately draw oil from the oil tank and supply oil pressure to the high pressure system, the frequency of use of the motor 12 that drives the electric oil pump 3 is increased, and the frequency of high temperature oil passing through the electric oil pump 3 is increased as well. Therefore, although the temperature of the circuit board of the driver 4 is likely to increase as well, in such a case, the energization prohibition control for the driver 4 is executed by the control unit 2, so damage or failure of the driver 4 can be effectively prevented.

Nevertheless, the disclosure is not limited to the embodiment described above and can be implemented in various forms. For example, in the embodiment, the oil temperature of the transmission is used as the temperature parameter that has a high correlation with the board temperature of the driver of the electric oil pump, and based upon to determine cancellation of the energization prohibition control. However, besides the oil temperature of the transmission, other temperature parameters having a correlation with the board temperature of the driver may also be used. The other temperature parameters include, for example, water temperature of the cooling water, intake air temperature, battery temperature, ambient temperature in the engine room, etc. One or two or more of these may be used to determine cancellation of the energization prohibition control.

Furthermore, in the embodiment, the value of the energization prohibition flag F_POFF is stored in the storage part 8 of the control unit 2. However, the storage part 8 that stores the value of the energization prohibition flag F_POFF may be configured as a part of a higher-level control unit or may be configured as an independent component as long as the control unit 2 can refer to the storage part 8 when started. In addition, the detailed configuration may be appropriately changed within the scope of the disclosure.

What is claimed is:

1. A power supply controller, controlling supply of electric power to an electric oil pump in a vehicle, which comprises a hydraulic transmission transmitting a driving force to a drive wheel, and the electric oil pump supplying an oil pressure to the hydraulic transmission, the power supply controller comprising:
    an electric oil pump control part comprising a circuit board and controlling an operation of the electric oil pump;
    control unit controlling power supply to the electric oil pump control part;
    board temperature sensor detecting a temperature of the circuit board; and
    oil temperature sensor provided in the hydraulic transmission and detecting a temperature of a working oil in the hydraulic transmission as an oil temperature,
    wherein the control unit executes energization prohibition control for prohibiting power supply to the electric oil pump control part when the temperature of the circuit board detected by the board temperature sensor exceeds a predetermined first threshold temperature, and executes cancellation determination for determining whether to cancel the energization prohibition control based on the oil temperature detected by the oil temperature sensor during execution of the energization prohibition control,
    wherein the control unit cancels the energization prohibition control when the oil temperature drops below a predetermined second threshold temperature lower than the first threshold temperature and an integrated value of a difference obtained by subtracting the oil temperature from the second threshold temperature exceeds a predetermined value in the cancellation determination.

2. The power supply controller according to claim 1, further comprising a storage part storing whether the energization prohibition control has been executed in a state where power supply to the electric oil pump control part is stopped as energization prohibition control information,
    wherein the control unit determines whether to execute the energization prohibition control based on the energization prohibition control information when power supply is restarted after power supply to the electric oil pump control part is stopped.

3. The power supply controller according to claim 2, wherein an oil pressure supply device supplying the oil pressure to the hydraulic transmission is provided,
    the oil pressure supply device comprises the electric oil pump and another oil pump provided on an upstream side of the electric oil pump, and
    the electric oil pump further pressurizes an oil pressure supplied from the another oil pump and supplies the oil pressure to the hydraulic transmission.

4. The power supply controller according to claim 1, wherein the control unit cancels the energization prohibition control regardless of the integrated value when the oil temperature drops below a predetermined third threshold temperature lower than the second threshold temperature in the cancellation determination.

5. The power supply controller according to claim 4, wherein an oil pressure supply device supplying the oil pressure to the hydraulic transmission is provided,
    the oil pressure supply device comprises the electric oil pump and another oil pump provided on an upstream side of the electric oil pump, and the electric oil pump further pressurizes an oil pressure supplied from the another oil pump and supplies the oil pressure to the hydraulic transmission.

6. The power supply controller according to claim 1, wherein an oil pressure supply device supplying the oil pressure to the hydraulic transmission is provided,
    the oil pressure supply device comprises the electric oil pump and another oil pump provided on an upstream side of the electric oil pump, and
    the electric oil pump further pressurizes an oil pressure supplied from the another oil pump and supplies the oil pressure to the hydraulic transmission.

* * * * *